Aug. 24, 1926.
W. H. STOREY
ROTARY TYPE DUPLICATING MACHINE
Filed July 9, 1925
1,597,490
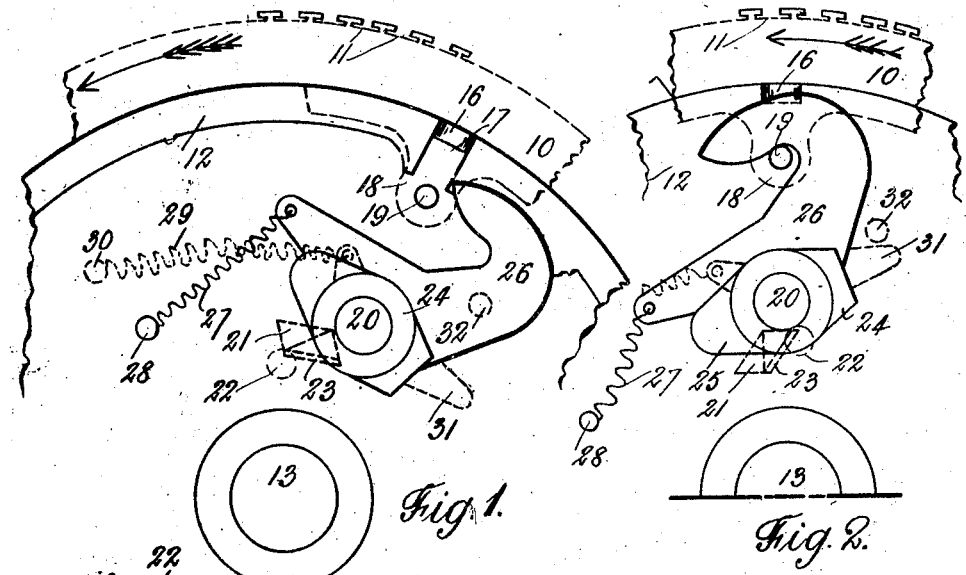
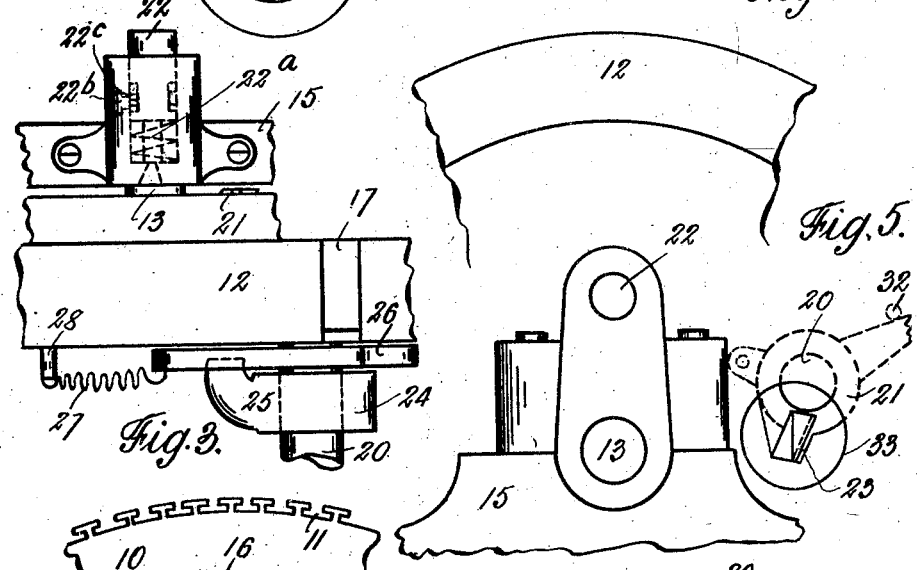
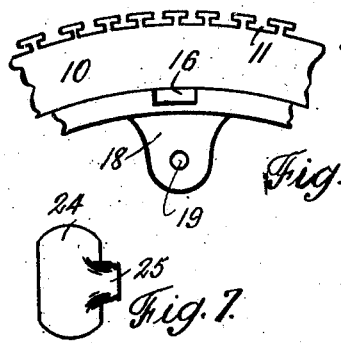
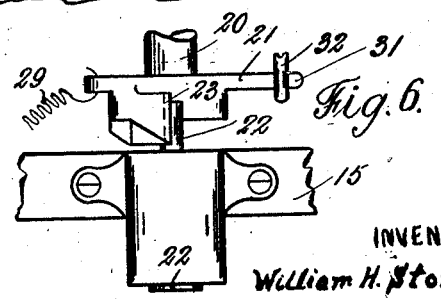
INVENTOR
William H. Storey
By Richards & Geier
Attys.

Patented Aug. 24, 1926.

1,597,490

UNITED STATES PATENT OFFICE.

WILLIAM HENRY STOREY, OF SOUTHEND ON SEA, ENGLAND.

ROTARY TYPE-DUPLICATING MACHINE.

Application filed July 9, 1925, Serial No. 42,408, and in Great Britain August 9, 1924.

The present invention relates to improvements in rotary type duplicating machines, and has for its object to improve upon the method of securing the printing segment to the machine.

In rotary type duplicating machines, the types have first to be set up on a forme, which forme is either in the nature of a flexible band secured to the segment, or the segment itself is formed with grooves into which the type characters or letters are slid.

The segment has hitherto been attached to the cylindrical flanges of the machine by means of powerful springs having hook shaped ends, the said ends being sprung over the main spindle of the machine on which are fitted the cylindrical flanges.

It is to be appreciated that operators of these machines are usually girls or youths, and owing to the necessarily powerful nature of the springs considerable strength and skill is required to effect proper attachment of the segment to the machine. Moreover, the sudden snapping over of the hook shaped ends of the springs on the shaft or spindle of the machine stings the hands of the operator. Again in attaching the segment to the machine, the segment has to be placed on to the top of the cylindrical flanges and then held securely there while the flanges and segment together are turned until the segment lies at the bottom to enable the hooks of the springs to be pulled into position, and as the segment is not secure while it is being turned there is danger that types may be damaged on projections of the machine, the segment may be dropped, or the operator's fingers may be pinched. Also, during the process of turning the segment round to its lowermost position the operator's hand is pressed on to the type surfaces and consequently receives inked impressions from the type. It will further be realized that if the operator places a segment in position on the flanges and omits to snap over the hooks on the spindle or fails completely to perform the locking operation, on starting the machine the segment will be impelled away from the machine with risk of injury to the operator and damage to the machine.

In a further example of the art the segment has been formed with stiffening webs and to the main shaft have been applied dogs which have turned over ends for engagement with holes or openings formed in the webs, the dogs being then locked to the segment and the shaft by means of screws.

In another method of attachment, the segment is secured to the main machine by means of slips, a bar, and a setscrew.

Depending upon screws for securing the segment to the machine is unsatisfactory and inconvenient since failure firmly to tighten the screws entails serious consequences, and moreover as the dogs are normally loose on the main shaft much time is absorbed in placing them in the correct position before they can be tightened up. In the case of segments secured by means of clips, a bar and a screw time is also absorbed in assembling these loose parts.

Now the present invention has for its object to overcome these disabilities by providing locking means which are applied to the cylindrical flanges rather than to the segment itself.

The invention consists primarily in a spring plunger housed in the machine in such a manner that when it is depressed and the machine is rotated, a shaft mounted between the main flanges is caused to rotate, and the rotation of the shaft operates hooks pivoted one on each end of the shaft, the ends of the hooks being formed in such a manner that they act upon pins driven into each end of the segment to lock the segment to the machine.

The invention also includes a stop on one of the cylindrical flanges which limits the backward rotation of the machine, the said stop abutting against the plunger.

The invention will now be described more particularly, reference being had to the accompanying drawings whereon:—

Fig. 1 is a fragmentary view in elevation of one of the cylindrical flanges with one of the hooks for locking the segment in its disengaged position.

Fig. 2 is a view similar to Fig. 1, but with a hook engaged on one of the pins of the segment to lock it to the machine.

Fig. 3 is a fragmentary view in plan showing the spring plunger partly in dotted lines and part of the means for operating one of the hooks.

Fig. 4 shows part of the segment with its key and one of the pins to be engaged by a hook.

Fig. 5 shows an elevational view of Fig.

3 with the cam which brings the hooks into and out of locking position with the pins of the segment.

Fig. 6 is a plan view of the cam and the spring pressed plunger.

Fig. 7 shows a detail view of one of the collars with its projection.

On the drawings 10 shows part of the segment which in the case under review is formed with grooves 11 for retaining the type characters. The segment fits on cylinder ends or flanges 12 (one shewn) which are mounted on a shaft 13. In the various views shewn the same cylinder end is used. The shaft 13 is supported between the side frames 15 of the machine.

The segment 10 is fitted with a key or keys 16 which fits or fit into a slot or slots 17 formed on the cylindrical flanges 12 and the segment is moreover formed with lugs 18 into which are driven pins 19.

A shaft 20 is secured between the cylindrical ends or flanges, the said shaft being free to rotate. To one end of the shaft outside of flange 12 is secured a cam 21 (Figs. 5 and 6). Through the side frame 15 is fitted a spring pressed plunger 22, which when pressed, and provided the machine is afforded a backward rotation acts on the face 23 of the cam in such a manner that the shaft 20 is afforded a partial revolution. Secured to the shaft 20 at each end between the flanges 12 are collars 24 (only one shewn) formed with projections 25, and between the collars and the flanges are pivoted hooks 26 having springs 27 attached thereto, the other ends of the springs being fitted on pins 28 secured to the cylindrical flanges 12. The projections 25 of the collars 24 are adapted to engage against the hooks 26 so that movement of the shaft 20 rotates the hooks into and out of operative position.

The cam 21 has secured thereto a spring 29, the other end of the spring being secured to a pin 30 fitted to the cylinder end 12. There is also formed on the cam a spur 31 which normally rests against a pin 32 secured to the flange 12 and so limits the action of the spring 29.

To attach the segment 10 to the machine that is over the cylindrical ends 12, the spring plunger 22 is pressed inwardly and the machine is rotated backwardly, or in a clockwise direction from the position shown in Fig. 2, until the face 23 of the cam 21 has come into contact with the plunger, when the cam, together with the shaft 20 to which it is affixed is rotated until the hooks 26 are carried into such a position that the hook ends have receded sufficiently to permit of the segment 10 being introduced on to the cylinder ends that is to say the position shown in Fig. 1. The segment is correctly positioned on the cylindrical ends 12 by the key or keys 16 entering the slot or slots 17. An opening 33 is formed in one of the flanges adjacent to the cam 21. When this opening comes opposite to the plunger 22, it acts in the nature of a stop if the machine is turned backwardly as the end of the plunger, when pressed, protrudes through the opening 33 and is caught against the edge of the opening and so prevents further movement of the machine at the position where the segment can be most conveniently received, that is at the top.

Assuming that the machine has been afforded the initial backward movement, and the stop 33 has abutted against the plunger 22, the segment 10 with its pins 19 secured thereto is placed over the cylindrical flanges or ends 12, the key 16 entering the slot 17 in one of the flanges. The machine can now be afforded a forward rotation. This rotation allows the springs 27 on the hooks 26 to pull the hooks into position to engage over the pins 19 on the segment 10 and thus secure the segment to the cylindrical flanges 12.

To remove the segment it is only necessary to depress the plunger 22, give the machine a rearward motion until the stop 33 prevents further movement and then lift the segment off the cylindrical ends 12.

Referring to Fig. 3, when the plunger 22 is pressed inwardly the spring $22^a$ is compressed and the movement of the plunger inwardly or outwardly is limited by the screw pin $22^b$ which abuts against one or other edge of a groove $22^c$ formed on the plunger.

By a re-arrangement of the various parts of the means for locking the segment to the machine herein described it is possible to eliminate affording a backward movement to the machine. That is to say the plunger may be depressed and the machine afforded a forward movement until the stop 33 acts on the plunger 22 to prevent further movement and the segment may then be lifted off or placed on to the machine in the way and manner already described.

The re-arrangement of the parts to use the invention in the manner just described simply entails reversing the positions of the cam 21, the hooks 26, collars 24 and the pins and springs. This will be readily understood if the drawing is viewed from the reverse side of the sheet when held up to the light for the purpose.

Having thus described my invention what I desire to secure by Letters Patent of the United States is as follows:—

1. Means for securing a printing segment to the cylindrical flanges of a rotary type duplicating machine comprising a spring plunger housed in one of the side frames of the machine, a shaft mounted between the cylindrical flanges adapted to be rotated when the said plunger is depressed and hooks pivoted on said shaft adapted to engage and hold the printing segment on to the machine.

2. Means for securing a printing segment to the cylindrical flanges of a rotary type duplicating machine comprising a spring plunger housed in one of the side frames of the machine, and a stop formed on one of the said flanges to limit the movement of the machine by abutting against the plunger.

3. Means for securing a printing segment to the cylindrical flanges of a rotary type duplicating machine comprising a shaft secured between the said flanges, a cam mounted on said shaft, and a spring pressed plunger housed in one of the side frames of the machines adapted to rotate the shaft when the machine is turned.

4. Means for securing a printing segment to the cylindrical flanges of a rotary type duplicating machine comprising a shaft secured between the said flanges, hooks fitted to said shaft, springs attached to said hooks, pins attached to the segment, and means whereby the hooks engage the pins of the segment to secure the segment to the cylindrical flanges.

5. Means for securing a printing segment to the cylindrical flanges of a rotary type duplicating machine comprising a shaft secured between the said flanges, hooks fitted to said shaft, springs attached to said hooks, pins attached to the segment, collars secured on the shaft, and projections on said collars to engage the hooks, when the shaft is turned with the pins fitted to the segment.

In testimony whereof, I have affixed my signature.

WILLIAM HENRY STOREY.